March 10, 1953 J. KAHL 2,630,711
MARINE CURRENT METER
Filed Sept. 7, 1950 3 Sheets-Sheet 1
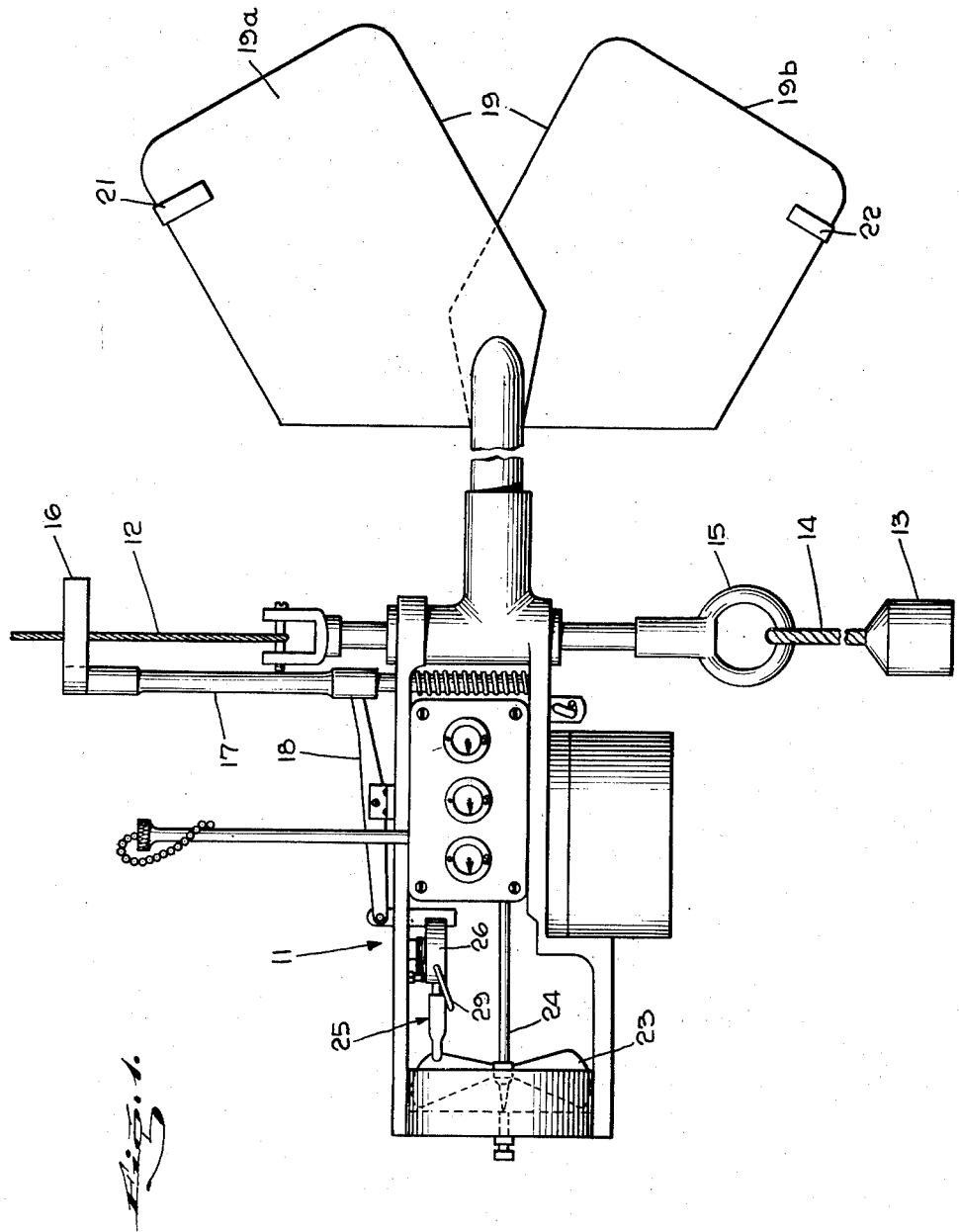
INVENTOR:
JOSEPH KAHL
BY HIS ATTORNEY
Israel Benjamins

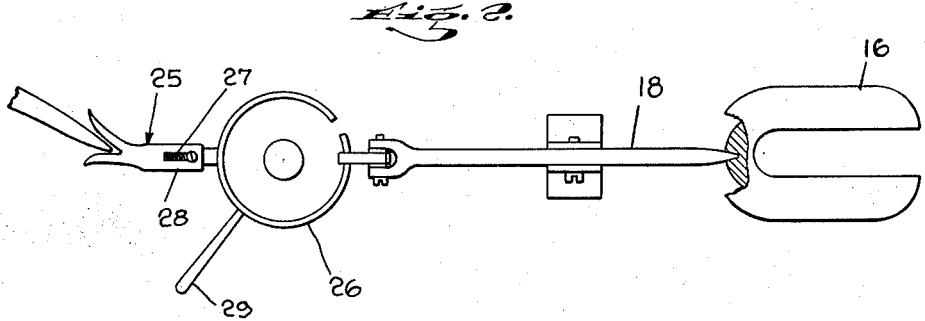
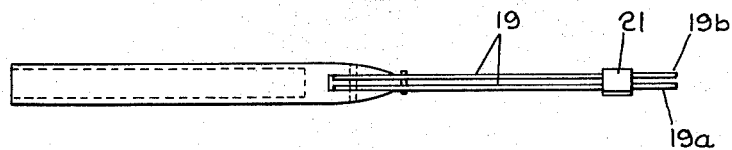
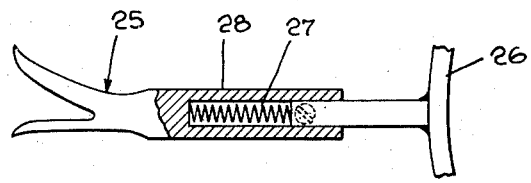
INVENTOR.
JOSEPH KAHL
BY HIS ATTORNEY
Israel Benjamins March 10, 1953 — J. KAHL — 2,630,711
MARINE CURRENT METER
Filed Sept. 7, 1950 — 3 Sheets-Sheet 3
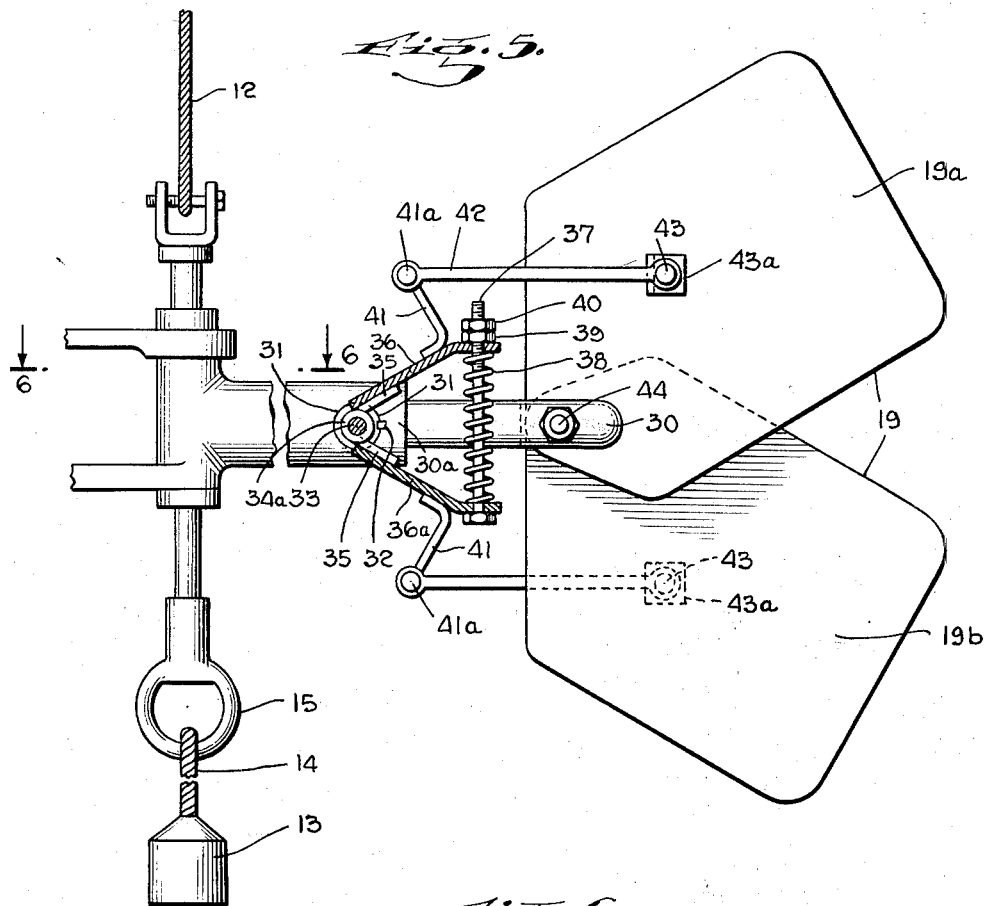
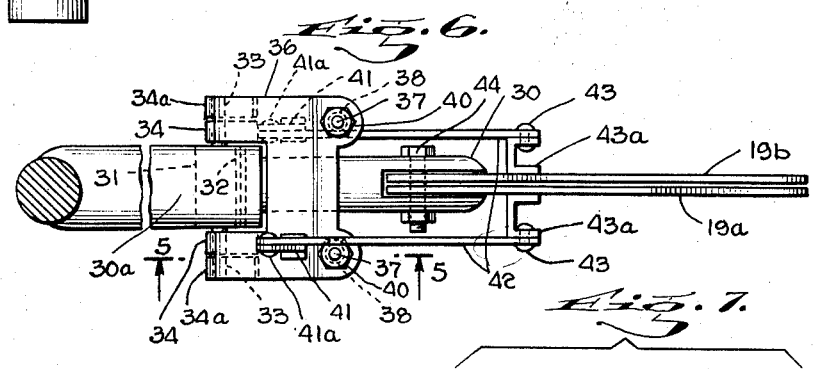
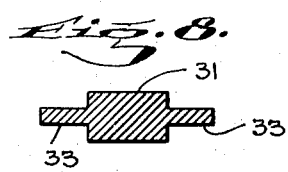
INVENTOR
JOSEPH KAHL
BY HIS ATTORNEY
Israel Benjamins,
ATTORNEY Patented Mar. 10, 1953

2,630,711

UNITED STATES PATENT OFFICE 2,630,711

MARINE CURRENT METER

Joseph Kahl, New York, N. Y.

Application September 7, 1950, Serial No. 183,560

7 Claims. (Cl. 73—189)

1

This invention relates to improvements in a marine current meter, and it consists in the novel features which are hereinafter described.

One of the objects of my improvement consists in providing a means for keeping the propeller of the meter from rotating until the required instant when a so called messenger or weight is dropped from the deck of the ship, from which the current meter is lowered into the ocean, onto a requisite part of the current meter, as is hereinafter described. Another object of my invention is to provide a means for initially accelerating the propeller when starting the test whereby to overcome the effects of inertia and friction in starting the test.

A still other object is to provide an expansible and collapsible stream vane for the current meter which will be more sensitive in currents of low velocity and not too erratic or unsteady in currents of high velocity; and whereby the stream vane may be reduced in size for conveniently enclosing it in a carrying case of relatively moderate size.

Other objects and advantages will hereinafter appear.

I attain these objects by the marine current meter one form of which is shown in the drawings or by any mechanical equivalent or obvious modification of the same.

In the drawings, Fig. 1 is a fragmentary side elevation of a marine current meter embodying my improvement and Fig. 2 is a partial plan view showing a forked blade holder for a propeller in position. Fig. 3 is an edge view of my improved collapsible stream vane for the marine current meter and Fig. 4 is a detail of the forked holder 25 which is hereinafter described.

Fig. 5 is a fragmentary vertical sectional view on the line 5—5 of Fig. 6, showing the rear end of the current meter with the current actuated governor connected thereto.

Fig. 6 is a fragmentary sectional view on the line 6—6 of Fig. 5; Fig. 7 is a detail of a pair of pivotal bearings which are hereinafter described, and Fig. 8 is a sectional view of a double pivot carrying member which is hereinafter described.

Similar numerals refer to similar parts throughout the several views.

11 designates an assembled marine current meter shown as connected to the lower end of a cable 12 by means of which it is lowered from the deck of a ship to a required depth and the cable 12 is kept in a more or less vertical position by means of a weight 13 which is shown as suspended by a short cord or chain 14 from a ring or loop 15 at the underside of the outfit.

2

The meter 11 is free to turn about the cable 12 in a substantially horizontal plane and it has thereon at the rear end thereof an arm 30 which extends rearwardly through a considerable distance beyond the cable 12 and is shown as broken off in Fig. 1 of the drawings, to indicate the greater length of the arm 30 by the omission of a part thereof.

The cable 12 passes through a fork 16 at the upper end of a resiliently mounted post 17 which is part of and is connected with a recording mechanism by means of a lever 18.

The operation of the mechanism is started by dropping from the deck of the ship a device called a messenger which encompasses the cable 12 and is intercepted by the fork 16. To stop the recording mechanism another messenger is dropped on top of the first messenger. The messengers are not shown in the drawings, nor most of the details of the mechanism which are well known in the art.

The marine current meter is kept in line with the current by means of a stream vane 19, which I propose to make of two sections 19a and 19b which are adjustably pivotally connected to each other and to the said arm 30 in the plane of the arm 30 which is extended rearwardly from the meter 11. The geometric center of the combined area of the meter 11 and the vane 19 is positioned rearwardly from the cable 12. The sections 19a and 19b when collapsed may be held together by a pair of clasps 21 and 22.

When extended with relation to each other the sections 19a and 19b of the stream vane are retained in position in a vertical plane by friction or otherwise and they serve to more accurately keep the current meter 11 in line with the direction of the current. The position of the sections 19a and 19b with relation to each other may be automatically controlled by a current actuated governor connected to the arm 30, substantially in line with the propeller shaft 24, as is hereinafter described and shown in Figs. 5 and 6 of the drawings.

A double pivot member 31 is secured to the root 30 of the arm 30 by means of a key 32 as shown in Figs. 5 and 6, or in any other suitable manner, with the pivots 33 extending in opposite directions.

A pair of pivotal bearings 34 and 34A are swivelled on each of the pivots 33; each of the said bearings has integral therewith a plate 35 which is fastened to one of a pair of inclined impact receiving platforms 36 and 36A at the front end of the latter; the rear ends of the platforms are then slidably connected to a pair of bolts 37, which are shown as encompassed each by a helical compression spring 38 which is initially stressed.

A nut 39 and a safety nut 40 on each bolt 37 serve to regulate the extent of the initial stress in each of the spring 38.

The platforms 36 and 36A receive the impact of the fluid current and resist it up to a certain valocity of the latter, the force of the impact being balanced by means of the initial stress in the springs 38; when the velocity of the fluid current increases still further, the springs 38 yield to the pressure of the platforms, contract in length and increase in pressure until they balance the impact of the increased velocity of the fluid current; the platforms 36 and 36A are thereby turned about the pivots 33 towards each other; the motion of the platforms is transmitted to the sections 19a and 19b of the stream vane 19 by means of brackets 41 on said platforms and connecting rods 42 which are pivotally connected each at one end thereof to the outer end 41a of said brackets 41 and at their other ends to the outer ends 43 of spacing columns 43a which are fastened to said sections 19a and 19b, thereby turning the said sections about the pivot 44 at the outer end of said arm 30 and causing them to overlap each other in part and thereby partly collapsing the stream vane 19.

A relatively small spring 38 would be required to collapse the stream vane 19; and the extra pull on the cable 12 would be balanced by the weight 13, which may be increased somewhat.

The fluid current is employed to revolve a screw propeller 23 which is shown as connected to the forward end of a shaft or spindle 24, the rear end of which operates the recording mechanism of the meter.

To start the rotation of the propeller 23 promptly and to keep it from being reversed by the current or to rotate when it is not desired, I provide a forked holder 25 which is controlled by an escapement 26 actuated by the said lever 18, which is operated by the mechanism of the meter 11. The forked holder 25 is connected to the escapement 26 by means of a spring 27 and a hollow sleeve 28 to allow the forked end of the holder to clear the propeller when necessary.

The holder 25 is manually engaged with and is intermittently kept in engagement with one of the blades of the propeller by the spring 27 and the escapement mechanism 26 of the meter 11 until the start of the recording by the dropping of a messenger. The holder 25 is then swung out of engagement with the blade of the propeller and thereby also imparting a rotary impulse to the propeller whereby to overcome or reduce the effect of friction and inertia of the propeller.

The escapement 26 has also connected thereto a stop pin 29 whereby to intercept one of the blades of the propeller 23 and to stop the rotation thereof by the dropping of the second messenger.

Variations are possible and parts of my invention may be used without other parts.

I do not, therefore, restrict myself to the details as shown in the drawing.

I claim as my invention and desire to secure by Letters Patent:

1. In a marine current meter which is suspended from a cable and has thereon an arm extending rearwardly beyond the lower end of the cable, a sectional, vertically disposed stream vane in the plane of said arm, adjustably supported by said arm, for keeping the meter in line with the current, said stream vane comprising multiple sections disposed parallel to each other and pivotably connected to each other and to said arm, said sections being held together by friction and current actuated means for moving said sections with relation to each other for expanding the said stream vane for use with currents of low velocity and for contracting the said stream vane for use with high velocity currents.

2. In a marine current meter a rearwardly extending arm, a vertically disposed sectional stream vane in the plane of the arm adjustably supported thereby, for keeping the meter in line with the current, the said stream vane comprising multiple sections disposed parallel to each other and pivotally connected to each other and to said arm, combined with a current actuated governor for automatically controlling the position of said sections with relation to each other, said governor being connected to said arm and to one or more of said sections.

3. In a marine current meter a rearwardly extending arm, a vertically disposed sectional stream vane in the plane of said arm adjustably supported thereby, for keeping the meter in line with the current, said stream vane comprising multiple sections disposed parallel to each other and pivotally connected to each other and to said arm, one of said sections being operatively connected to an impact receiving current actuated platform which is inclined to the direction of the current and pivotally connected at its forward end to said arm, combined with an initially stressed spring supported by a part which is connected to said arm and abutting at one end thereof against the rear end of said platform, whereby resiliently to limit the deflection of said platform, thereby limiting the change in the relative positions of the said sections.

4. In a marine current meter a rearwardly extending arm, a vertically disposed sectional stream vane in the plane of said arm adjustably supported thereby, for keeping the meter in line with said current, said stream vane comprising a pair of sections disposed parallel to each other, and pivotally connected to each other and to said arm, said sections being operatively connected each to one of a pair of oppositely inclined current actuated impact receiving platforms, which are inclined to the direction of the current and are pivotally connected at their forward ends to said arm, whereby to move said sections with relation to each other when the velocity of the current changes, thereby, changing the area of the stream vane.

5. In a marine current meter which is supported from a cable, a rearwardly extending arm, a vertically disposed sectional stream vane in the plane of said arm adjustably supported thereby, for keeping the meter in line with the current, said stream vane comprising a pair of sections disposed parallel to each other and pivotally connected to each other and to said arm, the said sections being operatively connected each to one of a pair of oppositely inclined current actuated impact receiving platforms which are inclined to the direction of the current and are pivotally connected at their forward ends to said arm, combined with one or more initially stressed springs supported by said platforms and abutting at their ends against the rear ends of the platforms, whereby resiliently to limit their deflection.

6. In a marine current meter the combination of a stream vane for keeping the meter in line with the current, a screw propeller to be driven by the current for actuating the meter, a means for starting and stopping the action of the meter, an escapement means actuated by said starting and stopping means and a forked holder controlled by said escapement means for engaging one of the blades of the propeller and keeping the propeller stationary before starting the meter and for initially accelerating the propeller when starting the meter.

7. In a marine current meter the combination of a stream vane for keeping the meter in line with the current, a screw propeller to be driven by the current for actuating the meter, a means for starting and stopping the action of the meter, an escapement means actuated by said starting and stopping means and a resiliently held forked holder controlled by said escapement means for engaging one of the blades of the propeller and keeping the propeller stationary before starting the meter and for initially accelerating the propeller when starting the meter.

JOSEPH KAHL.

REFERENCES CITED

The following references are of record in the file of this patent:

UNITED STATES PATENTS

| Number | Name | Date |
| --- | --- | --- |
| 947,833 | Lund | Feb. 1, 1910 |
| 1,022,385 | Boccardo | Apr. 2, 1912 |
| 1,819,155 | Fales | Aug. 18, 1931 |